(12) United States Patent
Kim et al.

(10) Patent No.: US 12,509,024 B2
(45) Date of Patent: Dec. 30, 2025

(54) ASSISTED SENSOR CLEANING SYSTEM

(71) Applicants: HYUNDAI MOTOR COMPANY, Seoul (KR); KIA CORPORATION, Seoul (KR)

(72) Inventors: Je Yeon Kim, Yangsan-si (KR); Hyun Woo Yoon, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 416 days.

(21) Appl. No.: 17/987,292

(22) Filed: Nov. 15, 2022

(65) Prior Publication Data

US 2023/0166694 A1 Jun. 1, 2023

(30) Foreign Application Priority Data

Nov. 29, 2021 (KR) .................. 10-2021-0166410

(51) Int. Cl.
*B60S 1/54* (2006.01)
*B60S 1/56* (2006.01)
(52) U.S. Cl.
CPC .. *B60S 1/54* (2013.01); *B60S 1/56* (2013.01)
(58) Field of Classification Search
CPC .......... G02B 27/0006; B60S 1/48; B60S 1/56; B60S 1/0848; B60S 1/54; B60Q 9/00
USPC ........................................................ 15/313
See application file for complete search history.

(56) References Cited

U.S. PATENT DOCUMENTS

| 11,273,798 | B2 | 3/2022 | Giraud | |
|---|---|---|---|---|
| 2019/0106086 | A1 | 4/2019 | Giraud | |
| 2020/0346624 | A1* | 11/2020 | Kahlund | B60S 1/548 |
| 2021/0323510 | A1* | 10/2021 | Fiebrandt | B05B 12/06 |

FOREIGN PATENT DOCUMENTS

KR  20180136981 A  12/2018

* cited by examiner

*Primary Examiner* — Katina N. Henson
(74) *Attorney, Agent, or Firm* — Lempia Summerfield Katz LLC

(57) ABSTRACT

Disclosed is an assisted sensor cleaning system configured to receive support from a cooperative system that assists the sensor cleaning system. The assisted sensor cleaning system includes: an air cleaning system including a compressor to produce compressed air, and an air tank to store the compressed air. In particular, the air cleaning system is configured to clean an environmental sensor of a vehicle by using the compressed air from the compressor or the air tank. The assisted sensor cleaning system further includes: a cooperative system including a cooperative compressor to produce compressed air used for the cooperative system, and a cooperative air tank to store the compressed air. The assisted sensor cleaning system includes: a gate set to selectively supply the compressed air from the cooperative system to the air cleaning system; and an integrated controller configured to at least partially control an operation of the gate set.

17 Claims, 2 Drawing Sheets

ASSISTED SENSOR CLEANING SYSTEM

CROSS-REFERENCE TO RELATED APPLICATION

This application claims under 35 U.S.C. § 119(a) the benefit of and priority to Korean Patent Application No. 10-2021-0166410, filed on Nov. 29, 2021, the entire contents of which are incorporated herein by reference.

BACKGROUND

(a) Technical Field

The present disclosure relates to a sensor cleaning system for a vehicle and, more particularly, to a sensor cleaning system configured to receive support from a cooperative system that assists the sensor cleaning system.

(b) Background

Recently, driver assistance systems for assisting drivers in vehicles are applied to the vehicles to ensure safe driving in various traveling situations. In addition to the driver assist systems, research and development has been further actively conducted on autonomous vehicles to autonomously travel without a driver's intervention.

The driver assistance system or the autonomous vehicle is equipped with various types of environmental sensors that may detect environments around the vehicle in various ways. Examples of the environmental sensor mounted in the vehicle may include a radar, a lidar, a camera, and the like.

Because these sensors are mounted outside the vehicle, sensing parts thereof may be easily contaminated by rainwater, snow, foreign substances such as dust, and the like. Because the sensors need to be kept clean at a certain level or higher to ensure sensor performance, sensor cleaning systems are mounted in the vehicles to clean the sensors when the sensing parts are contaminated.

The above information disclosed in this Background section is only to enhance understanding of the background of the present disclosure and therefore it may contain information that does not form the prior art that is already known to a person of ordinary skill in the art.

SUMMARY OF THE DISCLOSURE

The present disclosure has been made in an effort to solve the above-mentioned problem, and an object of the present disclosure is to provide an assisted sensor cleaning system capable of reducing a load applied to the sensor cleaning system.

The object of the present disclosure is not limited to the above-mentioned object, and other objects, which are not mentioned above, may be clearly understood from the following descriptions by those with ordinary skill in the art (hereinafter, referred to as 'those skilled in the art') to which the present disclosure pertains.

The features of the present disclosure for achieving the above-mentioned objects of the present disclosure and carrying out the characteristic function of the present disclosure to be described below are as follows.

In one aspect, the present disclosure provides an assisted sensor cleaning system. The assisted sensor cleaning system includes: an air cleaning system including a compressor configured to produce compressed air, and an air tank configured to store the compressed air. In particular, the air cleaning system is configured to clean an environmental sensor for a vehicle by using the compressed air from the compressor or the air tank. The assisted sensor cleaning system further includes a cooperative system disposed in the vehicle. In one embodiment, the cooperative system may be a separate system from the sensor cleaning system. The cooperative system may include: a cooperative compressor configured to produce compressed air used for the cooperative system, and a cooperative air tank configured to store the compressed air produced by the cooperative compressor, The cooperative system further includes: a gate set configured to selectively supply the compressed air from the cooperative system to the air cleaning system; and an integrated controller configured to at least partially control an operation of the gate set.

The present disclosure provides the sensor cleaning system for a vehicle, particularly, the sensor cleaning system capable of reducing the load of the compressor used for the air cleaning system.

The effects of the present disclosure are not limited to the above-mentioned effects, and the other effects, which are not mentioned above, should be clearly understood by those having ordinary skill in the art from the following description.

Other aspects and embodiments of the present disclosure are discussed below.

It is understood that the terms "vehicle" or "vehicular" or other similar term as used herein include motor vehicles in general. Such motor vehicles may encompass passenger automobiles including sports utility vehicles (SUVs), buses, trucks, various commercial vehicles, watercraft including a variety of boats and ships, aircraft, and the like. The terms also include hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered engine and electric-powered motor.

The above and other features of the present disclosure are discussed below.

BRIEF DESCRIPTION OF THE DRAWINGS

The above and other features of the present disclosure are now described in detail with reference to certain embodiments thereof illustrated in the accompanying drawings which are given hereinbelow by way of illustration only, and thus are not limitative of the present disclosure, and wherein.

Figure 1:
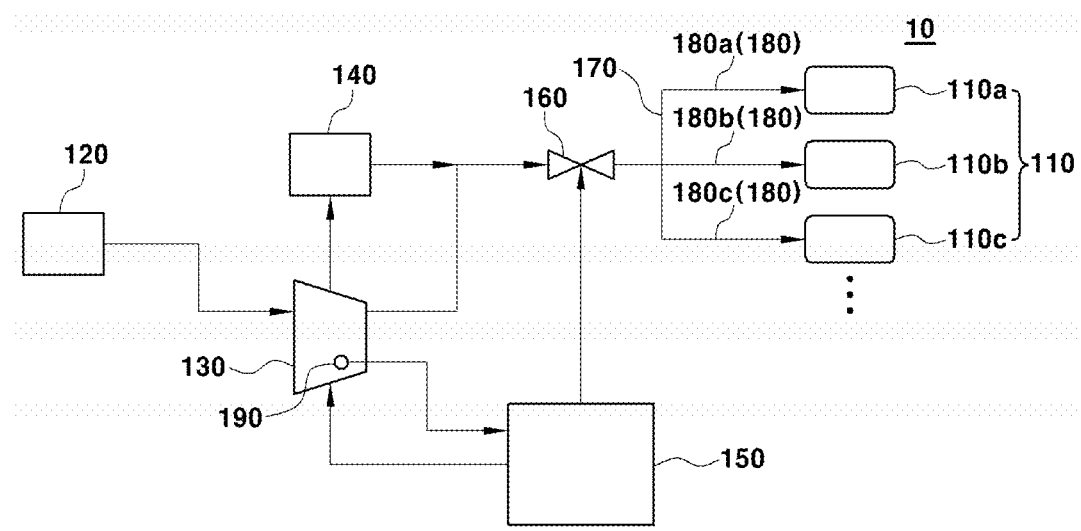
FIG. 1 is a configuration view of an air cleaning system according to one embodiment of the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference is now made in detail to various embodiments of the present disclosure, examples of which are illustrated in the accompanying drawings and described below. While the present disclosure is described in conjunction with the embodiments, it should be understood that present description is not intended to limit the present disclosure to those embodiments. On the contrary, the present disclosure is intended to cover not only the embodiments, but also various alternatives, modifications, equivalents and other embodiments, which may be included within the spirit and scope of the present disclosure.

Specific structural and functional descriptions disclosed in the embodiments of the present disclosure are only for the purpose of explaining the concept of the present disclosure. Thus, the embodiments according to the concept of the present disclosure may be carried out in various forms. In addition, the present disclosure should not be interpreted as being limited to the embodiments disclosed in the present specification. Instead, it should be understood that the present disclosure includes all modifications, equivalents, and alternatives included in the spirit and the technical scope of the present disclosure.

Meanwhile, the terms such as "first" and/or "second" in the present disclosure may be used to describe various constituent elements, but these constituent elements should not be limited by these terms. These terms are used only to distinguish one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, such as, "between" and "just between" or "adjacent to" and "directly adjacent to", for explaining a relationship between constituent elements, should be interpreted in a similar manner.

Like reference numerals indicate like constituent elements throughout the specification. Meanwhile, the terms used in the present specification are for explaining the embodiments, not for limiting the present disclosure. Unless particularly stated otherwise in the present specification, a singular form also includes a plural form. The terms "comprise (include)" and/or "comprising (including)" used in the specification are intended to specify the presence of the mentioned constituent elements, steps, operations, and/or elements, but do not exclude presence or addition of one or more other constituent elements, steps, operations, and/or elements.

When a component, device, element, or the like of the present disclosure is described as having a purpose or performing an operation, function, or the like, the component, device, or element should be considered herein as being "configured to" meet that purpose or to perform that operation or function.

Hereinafter, the present disclosure is described in detail with reference to the accompanying drawings.

As described above, sensor surfaces of environmental sensors for detecting environments around a vehicle need to be periodically cleaned to maintain the performance of the environmental sensors. For example, the environmental sensor may be contaminated by foreign substances, such as dust, sand, raindrops, snow, and the like.

The environmental sensor may be cleaned by using a washer fluid, high-pressure air, or the like. When the washer fluid is used to clean the sensors, moisture on the sensors may be removed by spraying air on the sensors. When using the high-pressure air, only high-pressure air is used to remove foreign substances from the sensor surface. If the washer fluid is used, regular maintenance is needed because the washer fluid needs to be supplemented on a regular basis. Meanwhile, the method of only using the high-pressure air to clean the sensor requires high-pressure air with a pressure of at least 5 bar or more and consumes a much more considerable amount of air in comparison with the method of using the washing liquid. Therefore, in case of the method of only using the high-pressure air, a large amount of load to the compressor is inevitable to supply such volume of high-pressure air although periodic maintenance is not required.

For this reason, there is concern that the compressor is frequently broken down. To eliminate the concern, a plurality of compressors is required for cleaning sensors. However, it is not efficient to apply multiple compressors to the single sensor cleaning system. Therefore, the present disclosure is intended to solve the above-mentioned problems by operating a sensor cleaning system in conjunction with a compressor used for another system in a vehicle.

FIG. 1 is a configuration view of a sensor cleaning system according to one embodiment of the present disclosure. The sensor cleaning system includes an air cleaning system 10 configured to clean an environmental sensor by using compressed air. The air cleaning system 10 cleans surfaces of environmental sensors (i.e., 110a, 110b, and 110c, collectively sensors "110") by spraying the compressed air. The environmental sensors 110 include sensing devices, such as a lidar, a radar, a camera, and the like for the vehicle. The environmental sensor 110 may be disposed on a front portion, a rear portion, a side portion, a roof, and the like, of the vehicle.

The sensor is cleaned by the sprayed compressed air. In one embodiment, the air may be filtered by an air filter 120 disposed in the vehicle, and the filtered air is introduced into a compressor 130. Then, the air is compressed by the compressor 130, and the compressed air is sprayed or injected onto a surface of the environmental sensors 110, thereby removing foreign substances from the surface of the environmental sensors 110. The environmental sensors 110 may include a plurality of environmental sensors 110a, 110b, 110c. Three environmental sensors are illustrated and described in the drawings and specification, but the present disclosure is not limited to the number of environmental sensors, and the number of environmental sensors may be increased or decreased.

In addition, the air cleaning system 10 includes an air tank 140. The air tank 140 may be filled with air compressed by the compressor 130 or air supplied from an external device. The air stored in the air tank 140 may be used to clean the environmental sensor 110.

In one embodiment, the air cleaning system 10 includes a controller 150 configured to operate a valve 160, (e.g., a solenoid valve) for each preset period or in a preset situation in which the contamination of any one of the environmental sensors 110 (e.g., 110a, 110b, or 110c) is detected. Therefore, the controller 150 sprays the compressed air to the respective environmental sensors 110 from the compressor 130 or the air tank 140, thereby cleaning the environmental sensors 110. In one embodiment, a distributor 170 may be provided on or integrated with the valve 160 and distribute the compressed air through nozzles 180a, 180b, 180c respectively provided for the respective environmental sensors 110a, 110b, 110c.

The compressor 130 has a temperature sensor 190. A temperature of the compressor 130 detected by the temperature sensor 190 is transmitted to the controller 150 of the air cleaning system 10. The controller 150 is configured to monitor the temperature of the compressor 130 such that the compressor 130 operates above an operating limit temperature. When the temperature of the compressor 130 reaches the operating limit temperature, the controller 150 may control the compressor 130 to stop the operation of the compressor 130 until the temperature of the compressor 130 decreases.

As described above, when the air cleaning system uses the air cleaning method, the operating time of the compressor is increased and a large amount of load is applied to produce a large amount of high-pressure air. Therefore, it is very important to maintain the air cleaning system to smoothly clean the sensor while reducing a load of the compressor.

Figure 2:
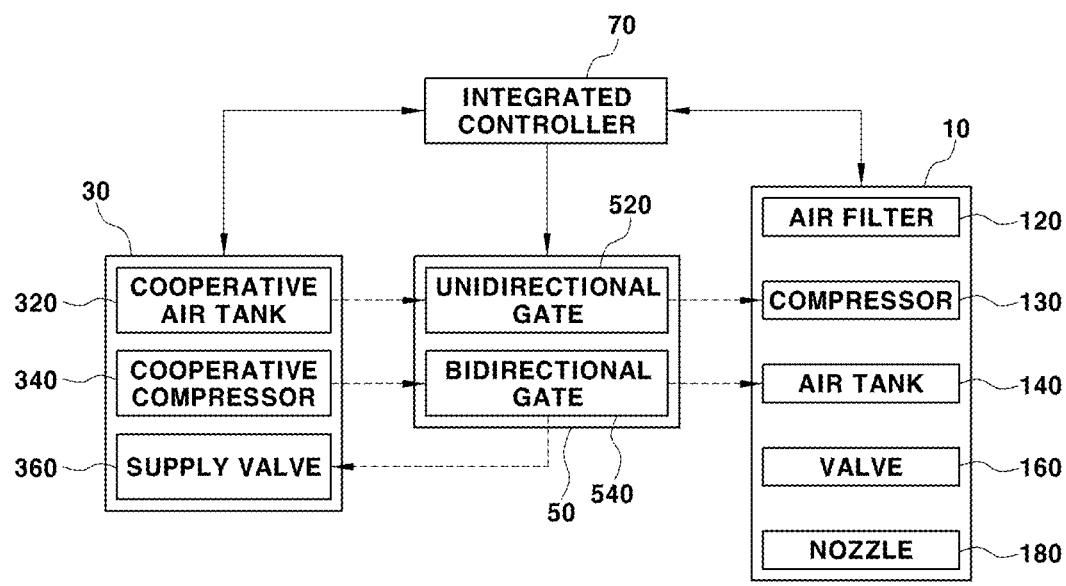
FIG. 2 is a configuration view of a sensor cleaning system according to one embodiment of the present disclosure.

As illustrated in FIG. 2, according to one embodiment of the present disclosure, the air cleaning system 10 may operate in conjunction with another system provided in the vehicle to reduce a load of the compressor. In one embodiment, the another system provided in the vehicle may be a cooperative system disposed outside the air cleaning system 10 and configured to operate with a compressor included therein. In a non-limiting example, the cooperative system may include an air suspension system. Therefore, the cooperative system 30 may be provided in plural.

According to one embodiment of the present disclosure, the cooperative system is used to reduce a load of the compressor 130 of the air cleaning system 10. In particular, the air cleaning system 10 may reduce a load of the compressor 130 by using a resource of another system in cooperation with another system when the load of the compressor 130 of the air cleaning system 10 exceeds a certain level. Hereinafter, in the present specification, such another system is referred to as the cooperative system 30. The cooperative system 30 is a system including a cooperative air tank 320 and a cooperative compressor 340.

The cooperative air tank 320 is configured to communicate with the compressor 130. The cooperative air tank 320 and the compressor 130 are connected by means of a high-pressure hose that may withstand a high pressure. When the load of the compressor 130 is a predetermined load or higher, the compressor 130 may be supplied with compressed air from the cooperative air tank 320 of the cooperative system 30. Because the cooperative air tank 320 of the cooperative system 30 stores air at a pressure higher than the atmospheric pressure, the compressor 130 may work less as the pressure of the air introduced into the compressor 130 is increased, which makes it possible to reduce the load of the compressor 130.

The cooperative compressor 340 may be configured to supply air to the air tank 140. In a high-load situation, the air cleaning system 10 may use high-pressure air produced by the cooperative compressor 340. The air produced by the cooperative compressor 340 may be selectively supplied to the air tank 140 of the air cleaning system 10.

In one embodiment, a gate set 50 may be provided to selectively supply air to the air cleaning system 10 from the cooperative air tank 320 or the cooperative compressor 340. The gate set 50 may include a unidirectional gate 520 and a bidirectional gate 540.

In the embodiment, the unidirectional gate 520 of the gate set 50 is disposed between the cooperative air tank 320 and the compressor 130. As a non-limiting example, the unidirectional gate 520 may be a one-way valve. However, another device may be applied as the unidirectional gate 520 as long as the device may operate like the one-way valve. When the unidirectional gate 520 is opened, the compressed air in the cooperative air tank 320 is supplied to the compressor 130 of the air cleaning system 10.

In an embodiment, the bidirectional gate 540 is disposed between the cooperative compressor 340 and the air tank 140. As a non-limiting example, the bidirectional gate 540 may be a two-way valve. However, another device may be applied as the bidirectional gate 540 as long as the device operates like the two-way valve. According to the operation of the bidirectional gate 540, the cooperative compressor 340 may supply the compressed air to the cooperative air tank 320 or a supply valve 360 or convey the compressed air to the air tank 140. The cooperative compressor 340 in the cooperative system 30 may store the produced compressed air in the cooperative air tank 320 or supply the compressed air, which is required for the cooperative system 30, through the supply valve 360.

The integrated controller 70 is configured to integrally control the operation of the air cleaning system 10 and the operation of the cooperative system 30. The integrated controller 70 may be configured such that the controller 150 of the air cleaning system 10 additionally has an ability to control the cooperative system 30.

Specifically, the integrated controller 70 determines a load state of the compressor 130 and controls the cooperative system 30 on the basis of the load state so that the compressor 130 may receive the support from the cooperative system 30. In addition, the integrated controller 70 may control the opening or closing of the valve 160 and thus control the supply of air for cleaning the environmental sensor 110 through the nozzle 180.

The integrated controller 70 of the cooperative system 30 is configured to control the operation of the gate set 50. As described below in detail, the integrated controller 70 may determine the load state of the cooperative compressor 340 and operate at least some of the gate set 50 on the basis of the load state.

Specifically, the integrated controller 70 is configured to obtain support from the cooperative system 30 when the load state of the compressor 130 is at the predetermined level or higher. In addition, the integrated controller 70 is configured to obtain support from the cooperative system 30 only when a load level of the cooperative compressor 340 is less than a predetermined value even though the load state of the compressor 130 is at the predetermined level or higher.

A method of controlling the air cleaning system 10 configured to receive support from the cooperative system, as described above, is described with reference to FIG. 3.

Figure 3:
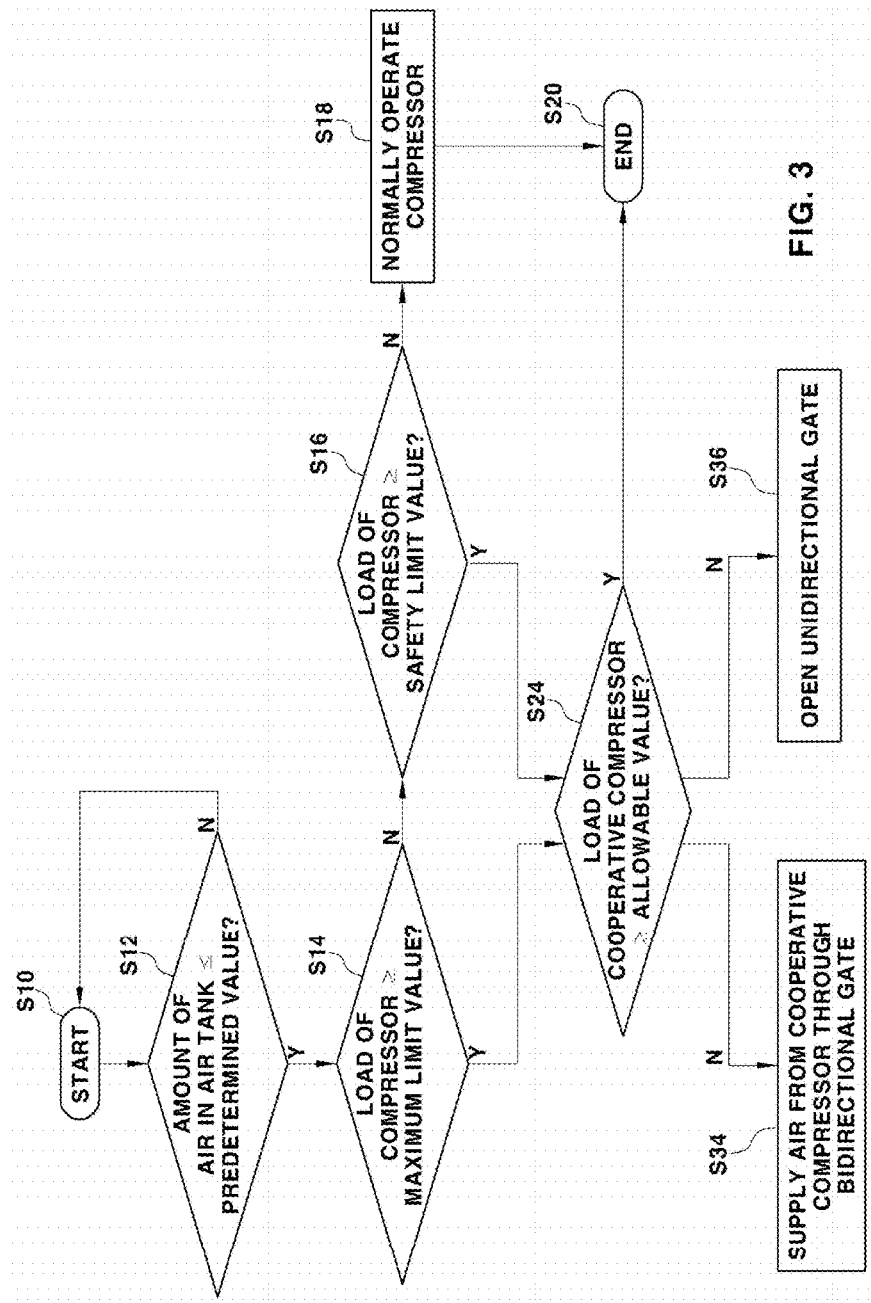
FIG. 3 is a flowchart illustrating a method of controlling the sensor cleaning system according to the present disclosure.

As illustrated in FIG. 3, in step S10, controlling the air cleaning system 10 is started.

Once the control started, the integrated controller 70 determines whether the amount of air in the air tank 140 of the air cleaning system 10 is equal to or smaller than a preset predetermined value (S12). The amount of air in the air tank 140 may be checked in every preset cycle. Because it is unnecessary to use the resource of the cooperative system 30 when the amount of air in the air tank 140 exceeds the predetermined value, checking the amount of air in the air tank 140 is first performed. When the amount of air in the air tank 140 exceeds the predetermined value, the air can be self-supported (i.e., air supplied from the air tank 140 of the air cleaning system 10). When the integrated controller 70 determines that the amount of air in the air tank 140 is equal to or smaller than the predetermined value, the integrated controller 70 determines the load state of the compressor 130. First, the integrated controller 70 determines whether the load of the compressor 130 is equal to or higher than a maximum limit value (S14). In a non-limiting example, the maximum limit value may be determined on the basis of a temperature of the compressor 130 or a capacity of a drier in the compressor 130. The compressor 130 cannot operate any further when the temperature of the compressor 130 exceeds the operating limit temperature or the drier has the amount of moisture exceeding a limit capacity. Therefore, it is determined that the load of the compressor 130 has reached a maximum limit when at least one of the temperature of the compressor 130 or the capacity of the drier reaches a limit value.

The integrated controller 70 determines whether the load of the compressor 130 is equal to or higher than a safety limit value even when the compressor 130 does not reach the maximum limit (S16). In an embodiment, the safety limit value may be selected by applying a safety margin to factors, that is, each of the temperature of the compressor 130 and the capacity of the drier, and the safety margin may vary depending on the factors. For example, when the operating limit temperature in respect to the temperature of the compressor 130 is 100 degrees celsius (° C.), a temperature of 80° C., which is calculated by applying a safety margin of 80%, may be used as the safety limit value. For example, a safety margin of 70% may be applied to the capacity of the drier. It is determined that the load state of the compressor 130 has reached a safety limit when any one of the temperature of the compressor 130 or the capacity of the drier reaches the preset safety limit value.

When the load of the compressor 130 does not reach the safety limit value, the integrated controller 70 allows the compressor 130 to typically operate (S18) and ends the control (S20).

In step S14, when the integrated controller 70 determines that the load of the compressor 130 is equal to or higher than the maximum limit value, the integrated controller 70 determines the load state of the cooperative compressor 340 of the cooperative system 30 which is intended to be used. Specifically, the integrated controller 70 determines whether the load of the cooperative compressor 340 is equal to or higher than an allowable value (S24). In an embodiment, the allowable value of the cooperative compressor 340 may be set and determined in the same way as the safety limit value of the compressor 130. In other words, to prevent the cooperative compressor 340 from affecting the performance of the cooperative system 30 while the cooperative system 30 operates, the cooperative compressor 340 is configured to assist the air cleaning system 10 only when the load of the cooperative compressor 340 is lower than the allowable value that is the safety limit. Specifically, when at least one of the temperature of the cooperative compressor 340 or the capacity of the drier in the cooperative compressor 340 reaches the allowable value which is the safety limit for each of the temperature of the cooperative compressor 340 and the capacity of the drier, the cooperative system 30 does not assist the air cleaning system 10. Therefore, the control is ended when the load of the cooperative compressor 340 is equal to or higher than the allowable value (S20).

The integrated controller 70 allows the cooperative system 30 to assist the air cleaning system 10 when the load of the compressor 130 is equal to or higher than the maximum limit value and the load of the cooperative compressor 340 is lower than the allowable value. Specifically, the integrated controller 70 performs control such that the air is supplied to the air tank 140 from the cooperative compressor 340 through the bidirectional gate 540 (S34).

Meanwhile, the integrated controller 70 allows the cooperative system 30 to assist the air cleaning system 10 when the load of the compressor 130 is lower than the maximum limit value but equal to or higher than the safety limit value and the load of the cooperative compressor 340 is lower than the allowable value. In this case, the integrated controller 70 opens the unidirectional gate 520 so that the air in the cooperative air tank 320 is supplied to the compressor 130.

According to the present disclosure, when the compressor of the air cleaning system is in the high-load state, the compressor of the air cleaning system reduces the load by receiving support from another system in the vehicle, such that the air cleaning system has more excellent operating performance.

According to the present disclosure, available resources in the vehicle are used to prevent the problem with the load of the compressor of the air cleaning system without providing a plurality of compressors, which makes it possible to improve economic feasibility.

The present disclosure, which has been described above, is not limited by the aforementioned embodiment and the accompanying drawings, and it should be obvious to those having ordinary skill in the art to which the present disclosure pertains that various substitutions, modifications and alterations may be made without departing from the technical spirit of the present disclosure.

The present disclosure has been described in detail with reference to some embodiments thereof. However, it should be appreciated by those having ordinary skill in the art that changes may be made in these embodiments without departing from the principles and spirit of the present disclosure.

What is claimed is:

1. An assisted sensor cleaning system comprising:
   an air cleaning system comprising a compressor configured to produce compressed air, and an air tank configured to store the compressed air, the air cleaning system configured to clean an environmental sensor of a vehicle by using the compressed air from the compressor or the air tank;
   a cooperative system disposed in the vehicle and comprising a cooperative compressor configured to produce compressed air for the cooperative system, and a cooperative air tank configured to store the compressed air produced by the cooperative compressor, wherein the cooperative system is separate from the air cleaning system;
   a gate set configured to selectively supply the compressed air from the cooperative system to the air cleaning system; and
   an integrated controller configured to at least partially control an operation of the gate set,
   wherein the gate set comprises a bidirectional gate configured to allow or block a flow of air from the cooperative compressor to the air tank, and wherein the bidirectional gate is configured to allow the flow of air from the cooperative compressor to the air tank at a first position and to allow the flow of air from the cooperative compressor into the cooperative system at a second position.

2. The assisted sensor cleaning system of claim 1, wherein the integrated controller is configured to control the gate set based on a load state of the compressor.

3. The assisted sensor cleaning system of claim 2, wherein the load state of the compressor is determined based on a temperature of the compressor or a capacity of a drier in the compressor.

4. The assisted sensor cleaning system of claim 2, wherein the integrated controller is configured to control the gate set based on a load state of the cooperative compressor.

5. The assisted sensor cleaning system of claim 1, wherein the gate set comprises a unidirectional gate configured to allow or block a flow of the compressed air from the cooperative air tank to the compressor.

6. The assisted sensor cleaning system of claim 5, wherein the unidirectional gate is a one-way valve.

7. The assisted sensor cleaning system of claim 1, wherein the bidirectional gate is a two-way valve.

8. The assisted sensor cleaning system of claim 1, wherein the flow of air from the cooperative compressor into the cooperative system is blocked at the first position, and the flow of air from the cooperative compressor to the air tank is blocked at the second position.

9. The assisted sensor cleaning system of claim 1, wherein the environmental sensor comprises a lidar, a radar, a camera, or a combination thereof, which are exposed to an outside of the vehicle.

10. A method of controlling an assisted sensor cleaning system for a vehicle, where the assisted sensor cleaning system includes a controller, an air cleaning system and a cooperative system, the method comprising:
   determining, by a controller, a load state of a compressor of the air cleaning system;
   controlling, by the controller, a gate set to supply compressed air generated by the cooperative system to an air tank of the air cleaning system based on the load state of the compressor;
   determining, by the controller, whether an amount of air in the air tank of the air cleaning system is equal to or smaller than a preset predetermined value before the load state of the compressor is determined; and
   determining, by the controller, the load state of the compressor based on the amount of air being equal to or smaller than the predetermined value.

11. The method of claim 10, comprising:
   determining, by the controller, whether a load state of a cooperative compressor of the cooperative system is lower than a preset allowable value based on the load state of the compressor being equal to or higher than a preset limit value; and
   controlling, by the controller, the gate set to supply the compressed air from the cooperative system to the air cleaning system based on the load state of the cooperative compressor being lower than the allowable value.

12. The method of claim 10, wherein determining the load state of the compressor of the cleaning system comprises:
   determining whether the load state of the compressor is equal to or higher than a preset threshold; and
   performing a control to allow a flow of air from a cooperative compressor of the cooperative system to an air tank of the air cleaning system through a bidirectional gate of the gate set based on the load state of the compressor being equal to or higher than the preset threshold.

13. The method of claim 12, comprising:
   determining whether the load state of the compressor is equal to or higher than a safety limit value, which is smaller than the threshold based on the load state of the compressor being lower than the threshold; and
   opening a unidirectional gate of the gate set to supply air from a cooperative air tank of the cooperative system to the compressor based on the load state of the compressor being equal to or higher than the safety limit value.

14. The method of claim 12, comprising:
   performing a control to allow a flow of air through the bidirectional gate based on the load state of the compressor being equal to or higher than the threshold and the load state of the cooperative compressor being lower than a preset allowable value.

15. The method of claim 13, comprising:
   opening the unidirectional gate based on the load state of the compressor being lower than the threshold and equal to or higher than the safety limit value and the load state of the cooperative compressor being lower than a preset allowable value.

16. The method of claim 13, wherein:
   the threshold is determined based on a temperature of the compressor or a capacity of a drier in the compressor, and
   the load state of the compressor is determined as being equal to or higher than the threshold based on a current temperature of the compressor being equal to or higher than a threshold or a current capacity of the drier exceeding a threshold.

17. The method of claim 16, wherein the safety limit value is a value set by applying a safety margin to the threshold.

* * * * *